United States Patent
Kikkawa

(10) Patent No.: US 9,219,382 B2
(45) Date of Patent: Dec. 22, 2015

(54) CONTROL APPARATUS, CONTROL METHOD, AND EXECUTION APPARATUS

(75) Inventor: Norifumi Kikkawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 900 days.

(21) Appl. No.: 13/401,280

(22) Filed: Feb. 21, 2012

(65) Prior Publication Data

US 2012/0229095 A1 Sep. 13, 2012

(30) Foreign Application Priority Data

Mar. 10, 2011 (JP) ................. 2011-052998

(51) Int. Cl.
*H02J 7/00* (2006.01)
*H02J 7/35* (2006.01)

(52) U.S. Cl.
CPC ............ *H02J 7/35* (2013.01); *H02J 7/0073* (2013.01); *H02J 2007/0049* (2013.01)

(58) Field of Classification Search
CPC ..................................... H02J 7/0091
USPC .............................. 320/152, 136
See application file for complete search history.

(56) References Cited

U.S. PATENT DOCUMENTS

| | | | |
|---|---|---|---|
| 2003/0149904 A1* | 8/2003 | Kim ................ | 713/330 |
| 2007/0220291 A1* | 9/2007 | Stufflebeam ......... | 713/320 |
| 2008/0109114 A1* | 5/2008 | Orita et al. ......... | 700/248 |
| 2008/0224663 A1* | 9/2008 | Mack ............... | 320/132 |

FOREIGN PATENT DOCUMENTS

JP  2003-256084  9/2003

* cited by examiner

*Primary Examiner* — Edward Tso
*Assistant Examiner* — Ahmed Omar
(74) *Attorney, Agent, or Firm* — Hazuki International, LLC

(57) ABSTRACT

A control apparatus includes: a detection section configured to detect whether a rechargeable battery is in a fully charged state or not, and if the detection section detects that the rechargeable battery is in the fully charged state, an execution control section configured to give an instruction to an execution apparatus to execute a holdable task using electric power supplied from the rechargeable battery.

16 Claims, 11 Drawing Sheets

FIG. 6

```
DistributedEnergySource device
  Charger service
    GetChargerInfo action
      IN chargingdeviceindex    // INFORMATION FOR IDENTIFYING RECHARGEABLE BATTERY
      OUT chargestatus          // STATE (CHARGING or DISCHARGING or CHARGE-STOPPED STATE)
      OUT chargevalue           // CURRENT AMOUNT OF CHARGE
      OUT maxchargevalue        // AMOUNT OF FULL CHARGE
```

FIG. 7

Scheduled device
 TaskHolder service  // SERVICE PROVIDED BY EXECUTION APPARATUS CAPABLE OF HOLDING HOLDABLE TASK
  GetTaskList(IN NONE OUT TASK LIST) action
   PROVIDES A LIST OF HOLDABLE TASKS.
   ONE OR A PLURALITY OF PIECES OF TASK INFORMATION INCLUDED IN A TASK LIST
   INCLUDES TASK-IDENTIFICATION INFORMATION, TASK NAME, AMOUNT OF
   POWER SCHEDULED TO BE USED BY THE TASK, EXECUTION START TIME,
   INFORMATION ON WHETHER TO CAUSE COMMUNICATION OR NOT, ETC.
  TaskList state variable
   FUNCTIONS AS GENA(PROTOCOL USED FOR EVENT NOTIFICATION).
   THAT IS TO SAY, EXECUTION APPARATUS STORES A CONTROL APPARATUS
   THAT HAS TRANSMITTED GENA Subscribe MESSAGE TO TaskHolder service, AND
   NOTIFIES CONTENTS AFTER THE CHANGE WHEN CONTENTS OF TASK LIST ARE CHANGED.
  DoTask (IN TASK-IDENTIFICATION INFORMATION OUT NONE) action
   EXECUTE TASK.
   CONTROL APPARATUS CAN USE TASK-IDENTIFICATION
   INFORMATION OBTAINED BY GetTaskList.
   IF TASK EXECUTION IS NOT STARTED NORMALLY,
   ERROR IS RETURNED TO CONTROL APPARATUS.

FIG. 10

| TASK | POWER CONSUMPTION BEFORE EXECUTION | IN EXECUTION | POWER CONSUMPTION AFTER EXECUTION |
|---|---|---|---|
| RICE COOKING | 20W | 1200W | 500W |
| WASHING | 10W | 200W | 0W |

FIG. 11

| | TASK CAUSING COMMUNICATION | TASK NOT CAUSING COMMUNICATION |
|---|---|---|
| COMMUNICATION COST HIGH | PRIORITY: LOW | PRIORITY: HIGH |
| COMMUNICATION COST LOW | PRIORITY: HIGH | PRIORITY: LOW |

CONTROL APPARATUS, CONTROL METHOD, AND EXECUTION APPARATUS

CROSS REFERENCES TO RELATED APPLICATIONS

The present application claims priority to Japanese Priority Patent Application JP 2011-052998 filed in the Japan Patent Office on Mar. 10, 2011, the entire content of which is hereby incorporated by reference.

BACKGROUND

The present disclosure relates to a control apparatus, a control method, and an execution apparatus.

In recent years, various countermeasures have been taken in order to solve the problem of global warming. As one of the countermeasures, many activities are conducted to reduce emissions of carbon dioxide in the atmosphere, which causes global warming It is said that the atmospheric emissions of carbon dioxide are mainly caused by the burning of fossil fuels at the time of electric power generation. Thus, as one of the activities for reducing carbon dioxide emissions in the atmosphere, techniques on new electric power generation are being developed in place of the electric power generation based on the burning of fossil fuels.

Examples of new electric power generation include electric power generation using renewable energy, etc., such as solar energy, wind energy, and the like. Among techniques for generating electricity using renewable energy, relatively small-scale techniques are being employed in ordinary households, for example. In a system employing electric power generation using renewable energy, electric power that has not been used instantly out of electric power obtained by the electric power generation is stored in a rechargeable battery. And when electric power becomes necessary, the electric power stored in the rechargeable battery is used by priority. Using such a mechanism, it is possible for a user to reduce a purchase amount of electricity from an electric power company.

A related-art technique has been disclosed in Japanese Unexamined Patent Application Publication No. 2003-256084, for example.

SUMMARY

However, there is a limit to electric power that can be stored in a rechargeable battery, and thus all the remaining electric power that has not been used instantly out of electric power obtained by power generation is not necessarily stored in the rechargeable battery. That is to say, there has been a problem in that when a rechargeable battery is in a fully charged state, electric power obtained by power generation is sometimes not allowed to be stored in the rechargeable battery, and is wasted in spite of the fact that electricity is generated by the power generator.

Thus, the present disclosure addresses the above identified and other problems. It is desirable to provide a new and improved technique capable of preventing electric power obtained by power generation from being wasted without being stored in a rechargeable battery even in the case where a rechargeable battery is in a fully charged state.

According to an embodiment of the present disclosure, there is provided a control apparatus including: a detection section configured to detect whether a rechargeable battery is in a fully charged state or not; and if the detection section detects that the rechargeable battery is in the fully charged state, an execution control section configured to give an instruction to an execution apparatus to execute a holdable task using electric power supplied from the rechargeable battery.

In the above-described control apparatus, if the detection section detects that the rechargeable battery is not in the fully charged state, the execution control section may restrict giving an instruction to the execution apparatus to execute the holdable task using electric power supplied from the rechargeable battery.

The above-described control apparatus may further include a storage section configured to store holdable task information for identifying a holdable task, wherein if the detection section detects that the rechargeable battery is in the fully charged state, the execution control section may give an instruction to the execution apparatus to execute a task identified by the holdable task information stored in the storage section using electric power supplied from the rechargeable battery.

The above-described control apparatus may further include a task-information acquisition section configured to acquire holdable task information for identifying a holdable task from the execution apparatus, wherein if the detection section detects that the rechargeable battery is in the fully charged state, the execution control section may give an instruction to the execution apparatus to execute a task identified by the holdable task information acquired by the task-information acquisition section using electric power supplied to the rechargeable battery.

In the above-described control apparatus, if the detection section detects that the rechargeable battery is not in the fully charged state, the execution control section may cause the storage section to store the holdable task information acquired by the task-information acquisition section.

In the above-described control apparatus, the detection section may detect again whether the rechargeable battery is in the fully charged state or not after the execution control section has executed a holdable task, and if the detection section detects again that the rechargeable battery is in the fully charged state, the execution control section may give an instruction to the execution apparatus to execute another holdable task using electric power supplied from the rechargeable battery.

In the above-described control apparatus, when execution start time associated with the holdable task information is stored in the storage section, even if the detection section detects that the rechargeable battery is not in the fully charged state, the execution control section may restrict giving an instruction to the execution apparatus to execute the holdable task using electric power supplied from the rechargeable battery before current time reaches the execution start time, and may give an instruction to the execution apparatus to execute the holdable task using electric power supplied from the rechargeable battery when the current time reaches the execution start time.

In the above-described control apparatus, if there are a plurality of the holdable tasks, the execution control section may determine an execution sequence of the plurality of the holdable tasks on the basis of individual power consumption before execution and power consumption after execution of the plurality of the holdable tasks, and may give an instruction to the execution apparatus to execute the plurality of the holdable tasks using electric power supplied to the rechargeable battery in the execution sequence.

In the above-described control apparatus, the detection section may obtain state information indicating whether the rechargeable battery is in the fully charged state or not from the rechargeable battery, and may detect whether the rechargeable battery is in the fully charged state or not on the basis of the state information.

In the above-described control apparatus, the detection section may obtain an amount of full charge of the rechargeable battery and a current amount of charge of the rechargeable battery, and may detect whether the rechargeable battery is in the fully charged state or not on the basis of the amount of full charge and the current amount of charge.

In the above-described control apparatus, if there is an unholdable task, the execution control section may give an instruction to the execution apparatus to execute the unholdable task using electric power supplied from the rechargeable battery regardless of the case where the detection section detects that the rechargeable battery is in the fully charged state and the case where the detection section detects that the rechargeable battery is not in the fully charged state.

According to another embodiment of the present disclosure, there is provided a method of controlling including: detecting whether a rechargeable battery is in a fully charged state or not; and giving an instruction to an execution apparatus to execute a holdable task using electric power supplied from the rechargeable battery if detected that the rechargeable battery is in the fully charged state.

According to still another embodiment of the present disclosure, there is provided an execution apparatus including, if a control apparatus detects that a rechargeable battery is in a fully charged state, a task execution section configured to execute a holdable task using electric power supplied from the rechargeable battery on the basis of an instruction given from the control apparatus.

The above-described execution apparatus may further include a task-information notification section configured to notify holdable task information for identifying the holdable task to the control apparatus, wherein if instructed from the control apparatus to execute the holdable task identified by the holdable task information notified by the task-information notification section to the control apparatus, the task execution section may execute the holdable task.

The above-described execution apparatus may further include an input section configured to receive input of operation information from a user; and on the basis of the operation information received by the input section, a unholdable task-information notification section configured to notify unholdable task-information being information for causing the control apparatus to handle a task identified by the holdable task information as an unholdable task.

As described above, by the present disclosure, it is possible to prevent electric power obtained by power generation from being wasted without being stored in a rechargeable battery even in the case where the rechargeable battery is in a fully charged state.

Additional features and advantages are described herein, and will be apparent from the following Detailed Description and the figures.

BRIEF DESCRIPTION OF THE FIGURES

FIG. 6 is a diagram illustrating an example of a service provided from the rechargeable battery according to an embodiment of the present disclosure to the control apparatus;

FIG. 7 is a diagram illustrating an example of a service provided from the execution apparatus according to an embodiment of the present disclosure to the control apparatus;

FIG. 10 is a diagram illustrating an example of a relationship between a task and power consumption;

FIG. 11 is a diagram illustrating an example of a relationship between a communication cost and a task priority;

DETAILED DESCRIPTION

Figure 1:
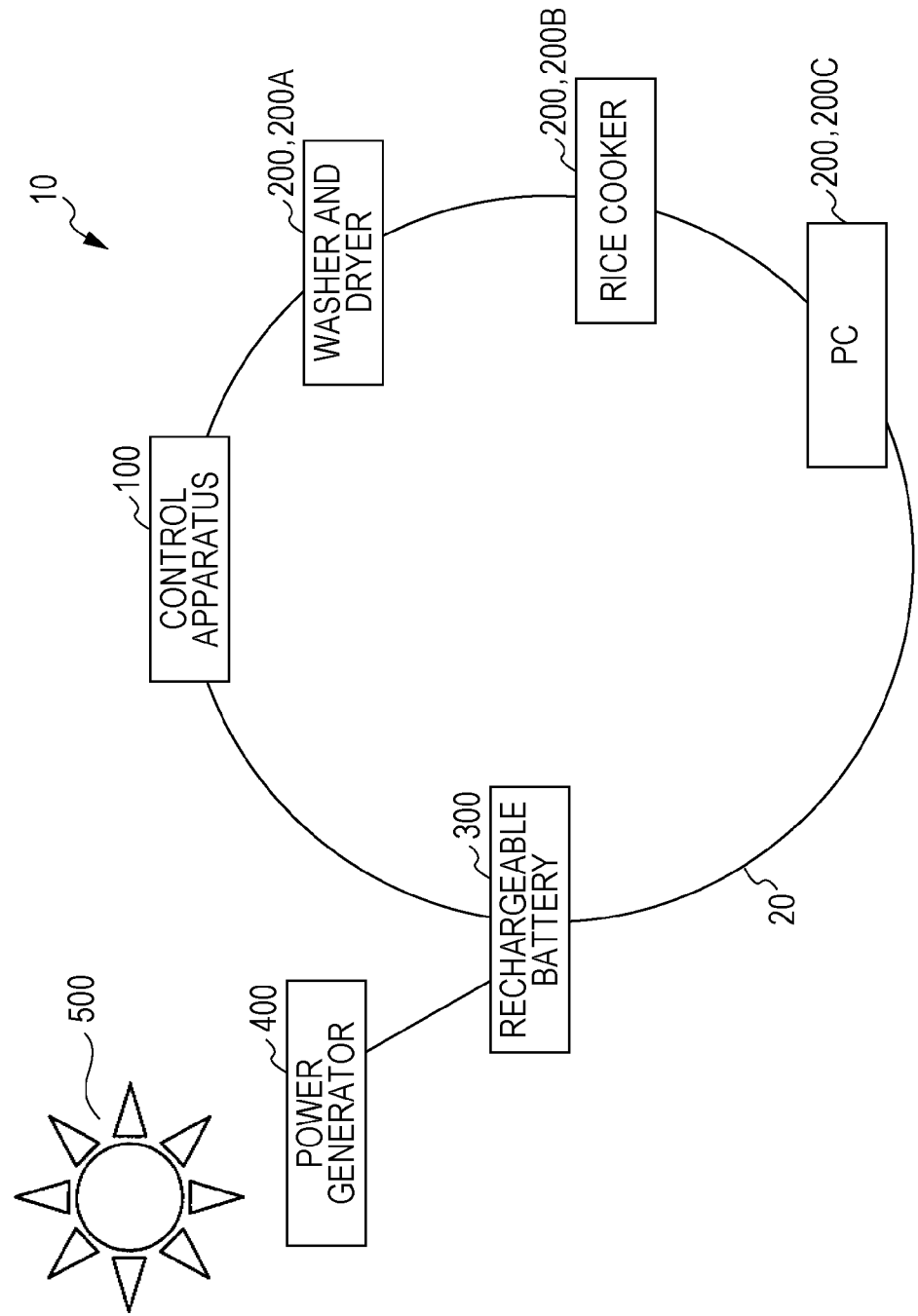
FIG. 1 is a diagram illustrating an example of a configuration of an information processing system according to an embodiment of the present disclosure.

In the following, detailed descriptions will be given of preferred embodiments of the present disclosure with reference to the attached drawings.

In this regard, in this specification and the drawings, a same reference numeral is given to a component having a substantially same functional configuration, and thus a duplicated description will be omitted.

Also, the descriptions will be given of the "Detailed Description of Embodiments" in the following order.
1. Embodiments
  1.1 Configuration of information processing system
  1.2 Overview of processing by information processing system
  1.3 Functional configuration of control apparatus
  1.4 Functional configuration of execution apparatus
  1.5 Functional configuration of rechargeable battery
  1.6 Service provided from rechargeable battery to control apparatus
  1.7 Service provided from execution apparatus to control apparatus
  1.8 Example of screen displayed by execution apparatus
  1.9 Another example of screen displayed by execution apparatus
  1.10 Relationship between task and power consumption
  1.11 Relationship between communication cost and task priority
  1.12 Operation of control apparatus
  1.13 Operation in executable state
2. Variations
3 Summary
1. Embodiments
1.1 Configuration of Information Processing System FIG. 1 is a diagram illustrating an example of a configuration of an information processing system according to an embodiment of the present disclosure. A description will be given of the example of the configuration of the information processing system according to the embodiment of the present disclosure with reference to FIG. 1.

As illustrated in FIG. 1, an information processing system 10 according to an embodiment of the present disclosure includes a control apparatus 100, an execution apparatus 200, and a rechargeable battery 300. The rechargeable battery 300 has a function of storing electric power obtained by power generation. A main body performing power generation is not specifically limited. For example, as illustrated in FIG. 1, the main body may be a power generator 400. The power generator 400, for example, converts energy supplied from an energy supplying source 500 into electric energy, and can supply the electric energy to the rechargeable battery 300. The electric energy supplied to the rechargeable battery 300 is stored into the rechargeable battery 300 as electric power.

In FIG. 1, the sun is illustrated as an example of the energy supplying source 500. FIG. 1 illustrates an example in which the power generator 400 converts light energy from the sun into electric energy. However, a source object that can be the energy supplying source 500 is not limited to the sun, and any object capable of supplying energy ought to be used. For example, it is possible for the energy supplying source 500 to supply wind energy to the power generator 400. In that case, the energy supplying source 500 corresponds to the atmosphere generating wind, etc.

For the energy supplied from the energy supplying source 500, renewable energy, such as light energy from the sun, wind energy, etc., may be used. Also, the energy supplied from the energy supplying source 500 may be renewable energy, such as thermal energy from the sun, hydraulic energy, thermal energy generated inside the earth, etc. Also, the energy supplied from the energy supplying source 500 may be non-renewable energy, such as energy obtained by burning fossil fuels, energy obtained by nuclear power generation, etc.

The execution apparatus 200 has a function of executing a task using electric power stored in the rechargeable battery 300. In FIG. 1, as examples of the execution apparatuses 200, a washer and dryer 200A, a rice cooker 200B, and a PC (Personal Computer) 200C are illustrated. However, the execution apparatus 200 ought to have a function of executing a task, and is limited to neither certain types of task nor certain kinds of the execution apparatus 200. Also, in FIG. 1, three apparatuses, namely the washer and dryer 200A, the rice cooker 200B, and the PC 200C are illustrated as the execution apparatuses 200. However, the number of the execution apparatuses 200 is not specifically limited as far as the number is one or more.

The control apparatus 100 has a function of controlling execution of a task by the execution apparatus 200 using the electric power stored in the rechargeable battery 300. Accordingly, when the control apparatus 100 gives an instruction to the execution apparatus 200, the execution apparatus 200 executes the task on the basis of the instruction. In this embodiment, a detailed description will be mainly given of the execution of a task by the execution apparatus 200.

In FIG. 1, an example is illustrated in which communications between the control apparatus 100 and the execution apparatus 200, between the execution apparatus 200 and the rechargeable battery 300, and between the rechargeable battery 300 and the control apparatus 100 are performed through a network 20. However, the communication is not limited to such an example. That is to say, for example, as illustrated in FIG. 1, the control apparatus 100 and the execution apparatus 200 may be separated, and may also be integrated. Of course, in the case where the control apparatus 100 and the execution apparatus 200 are integrated, the communication between the control apparatus 100 and the execution apparatus 200 through the network 20 becomes unnecessary.

Also, as illustrated in FIG. 1, the execution apparatus 200 and the rechargeable battery 300 may be separated, but also may be integrated. In the case where the execution apparatus 200 and the rechargeable battery 300 are integrated, the communication through the network 20 becomes unnecessary between the execution apparatus 200 and the rechargeable battery 300. In the same manner, as illustrated in FIG. 1, the rechargeable battery 300 and the control apparatus 100 may be separated, but also may be integrated. In the case where the rechargeable battery 300 and the control apparatus 100 are integrated, the communication through the network 20 becomes unnecessary between the rechargeable battery 300 and the control apparatus 100.

The network 20 may be, for example, Ethernet (registered trademark), Wi-Fi network, etc., corresponding to an IP (Internet Protocol) network, or ZigBee (registered trademark) network, etc., corresponding to a non-IP network. That is to say, a method for individually connecting the control apparatus 100, the execution apparatus 200, and the rechargeable battery 300 to the network 20, and a method by which the control apparatus 100, the execution apparatus 200, and the rechargeable battery 300 individually recognize with one another through the network 20 are not specifically limited. These methods may be provided by UPnP, for example.

1.2 Overview of Processing by Information Processing System

Figure 2:
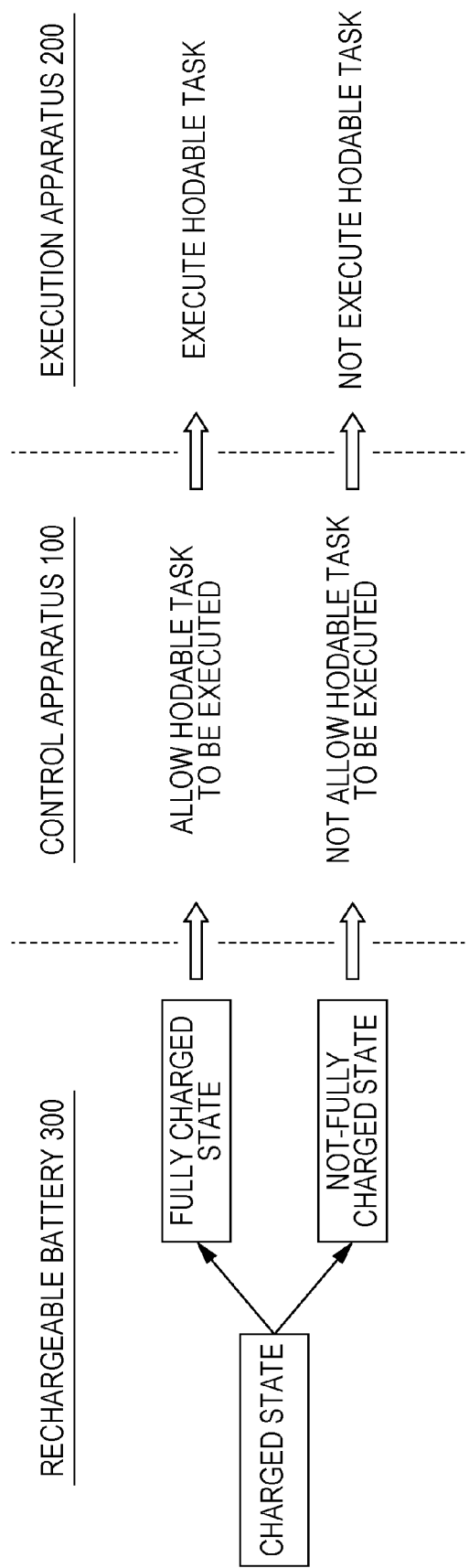
FIG. 2 is a diagram illustrating a processing overview by the information processing system according to an embodiment of the present disclosure.

FIG. 2 is a diagram illustrating an overview of processing by the information processing system 10 according to an embodiment of the present disclosure. A description will be given of the overview of the processing by the information processing system 10 with reference to FIG. 2.

As described above, the information processing system 10 according to the embodiment of the present disclosure includes the control apparatus 100, the execution apparatus 200, and the rechargeable battery 300. As illustrated in FIG. 2, as a state of charge of the rechargeable battery 300, it is assumed that there are a fully charged state and a state not reaching full charge (a state other than a fully charged state). In the present embodiment, if the rechargeable battery 300 is in a fully charged state, the control apparatus 100 can causes the execution apparatus 200 to execute a holdable task. Thereby, in the case where the rechargeable battery 300 is in the fully charged state, it is possible to prevent electric power obtained by power generation from being wasted without being allowed to be stored in the rechargeable battery 300.

The holdable task corresponds to a task that is not necessary to be executed immediately, or a task with lower urgency. For example, a holdable task is assumed to be a task that allows washing and drying of laundry to be completed until a next morning. This task can be executed by the washer and dryer 200A.

Also, for another example, a holdable task is assumed to be a task that allows rice cooking to be completed until a next morning. This task can be executed by the rice cooker 200B. Also, for another example, it is assumed that there is a holdable task that allows uploading daily log data and photographic data onto a sever on the Internet once per day. This task can be executed by the PC 200C.

Also, when the rechargeable battery 300 is not in a fully charged state, the control apparatus 100 can restrict the execution of a holdable task by the execution apparatus 200. The execution apparatus 200 executes the holdable task in response to the instruction from the control apparatus 100. That is to say, when an instruction is given to execute a holdable task using electric power supplied from the rechargeable battery 300, the execution apparatus 200 is allowed to execute the holdable task. Also, when an instruction is not given to execute a holdable task using electric power supplied from the rechargeable battery 300, the execution apparatus 200 is allowed not to execute the holdable task.

The fully charged state is a state in which, for example, the amount of electric power stored in the rechargeable battery 300 (in the following, also referred to as an "amount of charge") matches a maximum value of electric power that can be stored in the rechargeable battery 300 (in the following, also referred to as an "amount of full charge"). However, the fully charged state is not limited to such a state. For example, the control apparatus 100 may determine that a state in which the amount of charge reaches the amount of full charge decreased by a predetermined value is a fully charged state. The predetermined value may be suitably changed in accordance with the progress of deterioration of the rechargeable battery 300.

Also, the control apparatus 100 may detect that a state in which the amount of charge reached an amount of full charge has continued for a predetermined time period or more is a fully charged state. There is a high possibility that in such a state, electric power that is not allowed to be stored in the rechargeable battery 300 is continued to be supplied from the power generator 400 to the rechargeable battery 300, and thus it is possible for the control apparatus 100 to more correctly detect a state of wasting electric power by determining such a state to be a fully charged state.

Also, the control apparatus 100 may detect that a state in which the amount of charge has reached an amount of full charge, and electric power is being supplied from the power generator 400 to the rechargeable battery 300 is a fully charged state. There is a still higher possibility that in such a state (in the following, also referred to as a "surplus electric-power state"), electric power that is not allowed to be stored in the rechargeable battery 300 is continued to be supplied the power generator 400 to the rechargeable battery 300, and thus it is possible for the control apparatus 100 to still more correctly detect a state of wasting electric power by determining such a state to be a fully charged state.

Among tasks, there may be an unholdable task in addition to holdable tasks. An unholdable task corresponds to a task that is necessary to be executed immediately or a task with high urgency. For example, an unholdable task is assumed to be a task that obtains a search result from a server on the Internet in response to a search key input by a user. This task can be executed by the PC 200C.

The control apparatus 100 is allowed to instruct the execution apparatus 200 to execute an unholdable task using electric power supplied from the rechargeable battery 300 regardless of whether the rechargeable battery 300 is in a fully charged state or not. Accordingly, when the rechargeable battery 300 is in the fully charged state, both holdable tasks and unholdable tasks may be executed by the execution apparatus 200. However, there are specifically no restrictions on which tasks should be executed by priority among holdable tasks and unholdable tasks. That is to say, the priorities between holdable tasks and unholdable tasks may be set one to be higher than the other, or may be set identical.

1.3 Functional Configuration of Control Apparatus

Figure 3:
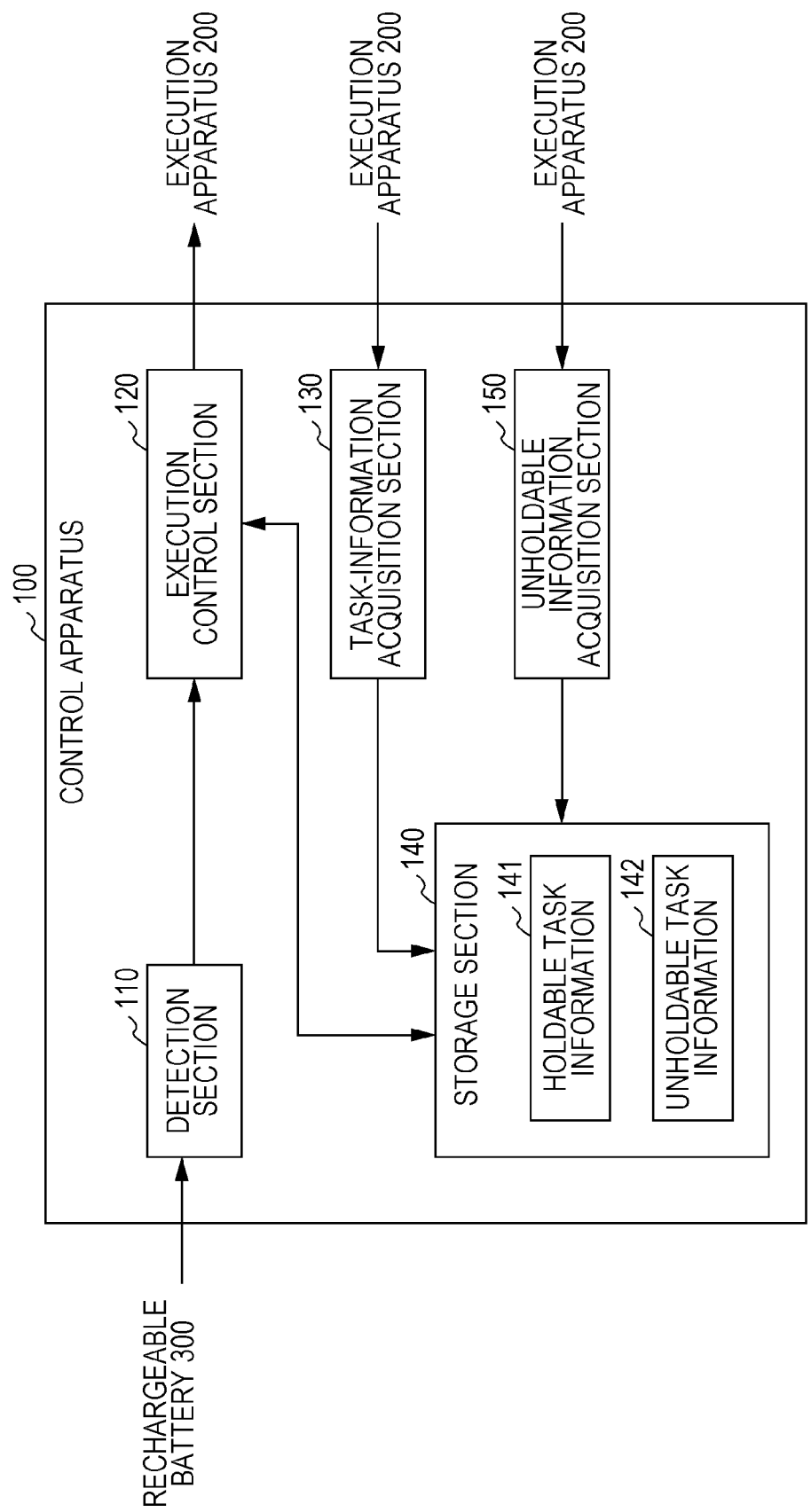
FIG. 3 is a diagram illustrating a functional configuration of a control apparatus according to an embodiment of the present disclosure.

FIG. 3 is a diagram illustrating a functional configuration of the control apparatus 100 according to the embodiment of the present disclosure. A description will be given of the functional configuration of the control apparatus 100 according to the embodiment of the present disclosure with reference to FIG. 3.

As illustrated in FIG. 3, the control apparatus 100 according to the embodiment of the present disclosure includes at least a detection section 110 and an execution control section 120. Also, the control apparatus 100 also includes a task-information acquisition section 130, a storage section 140, an unholdable-information acquisition section 150, etc., as necessary.

The detection section 110 has a function of detecting whether the rechargeable battery 300 is in a fully charged state or not. The execution control section 120 has a function of instructing the execution apparatus 200 to execute a holdable task using electric power supplied from the rechargeable battery 300 when the detection section 110 detects that the rechargeable battery 300 is in a fully charged state. Thereby, in the case where the rechargeable battery 300 is in a fully charged state, it becomes possible to prevent electric power obtained by power generation from being wasted without being stored in the rechargeable battery 300.

Also, the execution control section 120 is allowed to restrict giving an instruction to the execution apparatus 200 to execute a holdable task using electric power supplied from the rechargeable battery 300 if the detection section 110 detects that the rechargeable battery 300 is not in a fully charged state. As described above, for example, it is possible for the execution control section 120 not to give an instruction to the execution apparatus 200 to execute a holdable task using electric power supplied from the rechargeable battery 300 if the detection section 110 detects that the rechargeable battery 300 is not in a fully charged state. Thereby, it is possible to prevent a holdable task from being executed before the rechargeable battery 300 goes into a fully charged state.

The execution instruction of a holdable task may be given by any method. As illustrated in FIG. 3, the control apparatus 100 may further include, for example, the storage section 140 storing holdable task information 141 for identifying a holdable task. In that case, the execution control section 120 is allowed to give an instruction to the execution apparatus 200 to execute a task identified by the holdable task information 141 and using electric power supplied from the rechargeable battery 300 in the case where the detection section 110 detects that the rechargeable battery 300 is in a fully charged state. The execution control section 120 may delete the holdable task information 141 from the storage section 140 when the execution control section 120 has given an instruction to the execution apparatus 200 to execute a task identified by the holdable task information 141.

The holdable task information 141 may be, for example, input by a user, and then may be stored in the storage section 140. The storage section 140 may be constituted by a storage device, for example, an HDD (Hard Disk Drive), etc., and may store various kinds of data to be used by the detection section 110, the execution control section 120, the task-information acquisition section 130, and the unholdable-information acquisition section 150. The storage section 140 is not necessarily included in the control apparatus 100, and may be provided outside the control apparatus 100.

Also, the control apparatus 100 may further include, for example, the task-information acquisition section 130 acquiring the holdable task information 141 for identifying a holdable task from the execution apparatus 200. In that case, the execution control section 120 is allowed to give an instruction to the execution apparatus 200 to execute a task identified by the holdable task information 141 obtained by the task-information acquisition section 130 using electric power supplied to the rechargeable battery 300 in the case where the detection section 110 detects that the rechargeable battery 300 is in a fully charged state.

When the execution control section 120 does not allow a holdable task to be executed immediately, the execution control section 120 can store information for identifying the task into the storage section 140 as holdable task information 141. That is to say, when the detection section 110 detects that the rechargeable battery 300 is not in a fully charged state, the execution control section 120 can also store the holdable task information 141 obtained by the task-information acquisition section 130 into the storage section 140. In this manner, the execution control section 120 can cause the execution apparatus 200 to execute a holdable task that is identified by the holdable task information 141 stored in the storage section 140 (for example, when the rechargeable battery 300 has reached the full charge).

When the fully charged state of the rechargeable battery 300 continues, the control apparatus 100 may consecutively execute a plurality of holdable tasks. In that case, the detection section 110 detects again whether the rechargeable battery 300 is in a fully charged state or not after the execution control section 120 causes to execute the holdable task. And the execution control section 120 can instruct the execution apparatus 200 to execute another holdable task using electric power supplied from the rechargeable battery 300 when the detection section 110 detects again that the rechargeable battery 300 is in the fully charged state.

Also, as described above, it is assumed that there is an unholdable task. That is to say, it is possible for the execution control section 120 to instruct the execution apparatus 200 to execute an unholdable task using electric power supplied from the rechargeable battery 300 regardless of whether detection section 110 detects that the rechargeable battery 300 is in a fully charged state or the detection section 110 detects that the rechargeable battery 300 is not in the fully charged state.

As illustrated in FIG. 3, the storage section 140 may store, for example, unholdable task information 142 for identifying an unholdable task. In that case, the execution control section 120 is allowed to instruct the execution apparatus 200 to execute the unholdable task identified by the unholdable task information 142. When the execution control section 120 has instructed the execution apparatus 200 to execute a task identified by the unholdable task information 142, the execution control section 120 may delete the unholdable task information 142 from the storage section 140.

The unholdable task information 142 may be, for example, input by the user, and then may be stored in the storage section 140.

Also, it is possible for the control apparatus 100 to change a task identified by holdable task information 141 into an unholdable task. More specifically, the control apparatus 100 may further include, for example, an unholdable-information acquisition section 150 acquiring unholdable information which is information for handling a task identified by the holdable task information 141 as an unholdable task from the execution apparatus 200. The unholdable-information acquisition section 150 can change a task identified by the holdable task information 141 specified by unholdable information to be handled as an unholdable task.

The detection section 110, the execution control section 120, the task-information acquisition section 130, and the unholdable-information acquisition section 150 are configured, for example, by a CPU (Central Processing Unit), a RAM (Random Access Memory), etc. And functions of the above-described sections are achieved by the CPU loading programs stored in the storage section 140 onto the RAM, and executing the programs. However, the above-described sections are not limited to such a configuration. The detection section 110, the execution control section 120, the task-information acquisition section 130, and the unholdable-information acquisition section 150 may be configured by dedicated hardware.

1.4 Functional Configuration of Execution Apparatus

Figure 4:
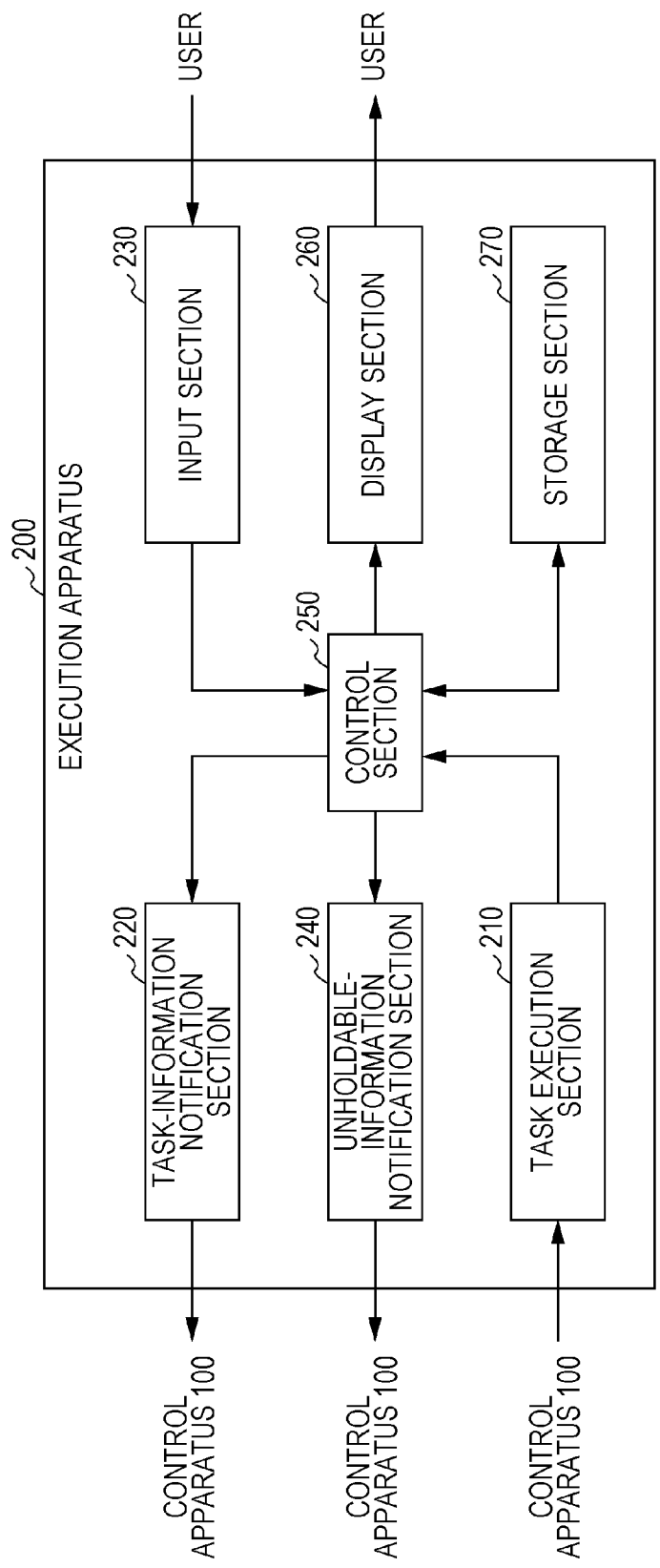
FIG. 4 is a diagram illustrating a functional configuration of an execution apparatus according to an embodiment of the present disclosure.

FIG. 4 is a diagram illustrating a functional configuration of the execution apparatus 200 according to the embodiment of the present disclosure. A description will be given of the functional configuration of the execution apparatus 200 according to the embodiment of the present disclosure with reference to FIG. 4.

As illustrated in FIG. 4, the execution apparatus 200 according to the embodiment of the present disclosure includes at least a task execution section 210. Also, the execution apparatus 200 includes a task-information notification section 220, an input section 230, an unholdable-information notification section 240, a control section 250, a display section 260, a storage section 270, etc., as necessary.

The task execution section 210 has a function of executing a holdable task using electric power supplied from the rechargeable battery 300 on the basis of an instruction given from the control apparatus 100 when the control apparatus 100 detects that the rechargeable battery 300 is in a fully charged state. Thereby, it becomes possible to prevent electric power obtained by power generation from being wasted without being stored in the rechargeable battery 300 in the case where the rechargeable battery 300 is in the fully charged state.

The execution apparatus 200 is allowed to further include the task-information notification section 220 notifying holdable task information 141 for identifying a holdable task to the control apparatus 100. In that case, when the control apparatus 100 has instructed the task execution section 210 to execute a holdable task identified by the holdable task information notified from the task-information notification section 220 to the control apparatus 100, the task execution section 210 ought to execute the holdable task.

The execution apparatus 200 may further include the input section 230 receiving input of operation information from a user, and the unholdable-information notification section 240 notifying unholdable information which is information for causing the control apparatus 100 to handle a task identified by the holdable task information 141 as an unholdable task on the basis of the input operation information received by the input section 230. The execution apparatus 200 notifies the unholdable information to the control apparatus 100 so as to allow the control apparatus 100 to change to handle the unholdable task as a holdable task.

The control section 250 has a function of controlling overall operation of the execution apparatus 200. The task execution section 210, the task-information notification section 220, the unholdable-information notification section 240, and the control section 250 are configured, for example, by a CPU, a RAM, etc. And functions of the above-described sections are achieved by the CPU loading programs stored in the storage section 270 onto the RAM, and executing the programs. However, the above-described sections are not limited to such a configuration. The task execution section 210, the task-information notification section 220, the unholdable-information notification section 240, and the control section 250 may be configured by dedicated hardware.

The display section 260 is allowed to display various kinds of information under the control of the control section 250. The various kinds of information displayed by the display section 260 is referenced, for example, when the user inputs operation information into the input section 230. The display section 260 is not necessarily included in the execution apparatus 200, and may be disposed outside the execution apparatus 200. Also, the display section 260 is not necessarily a requisite that is disposed inside or outside the execution apparatus 200.

The storage section 270 is configured by a storage device, for example, an HDD, etc. And the storage section 270 is capable of storing various kinds of data that is used by the task execution section 210, the task-information notification section 220, the unholdable-information notification section 240, and the control section 250. The storage section 270 is not necessarily a requisite that is disposed inside the execution apparatus 200, and may be disposed outside the execution apparatus 200.

1.5 Functional Configuration of Rechargeable Battery

Figure 5:
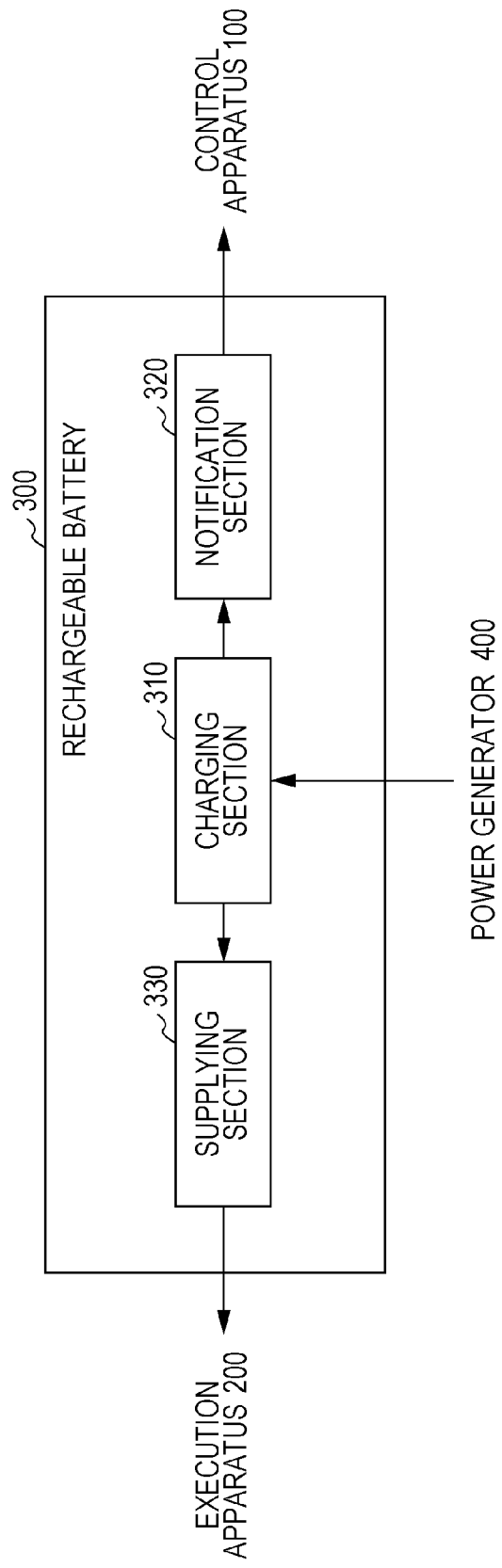
FIG. 5 is a diagram illustrating a functional configuration of a rechargeable battery according to an embodiment of the present disclosure.

FIG. 5 is a diagram illustrating a functional configuration of the rechargeable battery 300 according to an embodiment of the present disclosure. A description will be given of the functional configuration of the rechargeable battery 300 according to the embodiment of the present disclosure with reference to FIG. 5.

As illustrated in FIG. 5, the rechargeable battery 300 according to the embodiment of the present disclosure includes at least a charging section 310. Also, the rechargeable battery 300 includes a notification section 320, a supplying section 330, etc., as necessary.

The charging section 310 has a function of storing electric power supplied from the power generator 400. The charging section 310 stores electric energy supplied from the outside of the power generator 400, etc., as electricity so as to store electric power for allowing the execution apparatus 200 to execute a task. The charging section 310 includes, for example, a rechargeable battery, but a type of the rechargeable battery is not specifically limited.

The notification section 320 has a function of notifying information for determining whether the charging section 310 is in a fully charged state or not to the control apparatus 100. The notification section 320 may notify, for example, both the current amount of charge of the charging section 310 and an amount of full charge of the charging section 310 to the control apparatus 100. In such a case, the notification section 320 may, for example notify both the current amount of charge of the charging section 310 and an amount of full charge of the charging section 310 to the control apparatus 100 in response to a request from the detection section 110, or may notify the amounts at predetermined regular intervals.

Also, the notification section 320 may notify information indicating whether the charging section 310 is in a fully charged state or not to the control apparatus 100. In such a case, the notification section 320 may notify information on whether the charging section 310 is in a fully charged state or not to the control apparatus 100, for example in response to a request from the detection section 110, or may notify the information at predetermined regular intervals. Also, the notification section 320 may notify that a state of charge of the charging section 310 has changed to the control apparatus 100 at the time when the charging section 310 becomes the fully charged state and at the time when the charging section 310 goes out of the fully charged state.

Information for determining whether the charging section 310 is in the fully charged state or not may be notified only to the control apparatus 100, or may be notified to all the apparatuses connected to the network 20 by broadcast.

The supplying section 330 has a function of supplying electric power stored in the charging section 310 to the execution apparatus 200. The electric power supplied to the execution apparatus 200 is mainly used for executing a task. In this embodiment, the electric power supplied to the execution apparatus 200 is mainly used for the execution apparatus 200 executing a holdable task. Also, the electric power supplied to the execution apparatus 200 may be used for the execution apparatus 200 executing an unholdable task.

1.6 Service Provided from Rechargeable Battery to Control Apparatus

FIG. 6 is a diagram illustrating an example of a service provided from the rechargeable battery 300 according to the embodiment of the present disclosure to the control apparatus 100. A description will be given of the service provided from the rechargeable battery 300 according to the embodiment of the present disclosure to the control apparatus 100 with reference to FIG. 6.

The notification section 320 of the rechargeable battery 300 provides the control apparatus 100 with, for example, an SOAP action ("GetChargerinfo action" in the example illustrated in FIG. 6) of UPnP, so that notification section 320 can notify information for determining whether the charging section 310 is in a fully charged state or not to the control apparatus 100. That is to say, the detection section 110 of the control apparatus 100 calls the SOAP action of UPnP so as to be allowed to obtain information for determining whether the charging section 310 is in a fully charged state or not from the rechargeable battery 300.

As illustrated in FIG. 6, the information for determining whether the charging section 310 is in the fully charged state or not may be "chargevalue (the current amount of charge)" and "maxchargevalue (amount of full charge)". For example, the detection section 110 can detect whether the charging section 310 is in the fully charged state or not on the basis of "chargevalue (the current amount of charge)" and "maxchargevalue (amount of full charge)". For a detection method, various kinds of methods are assumed.

Also, as illustrated in FIG. 6, the information for determining whether the charging section 310 is in the fully charged state or not may be state information ("chargestatus (state)" in the example illustrated in FIG. 6) indicating whether the rechargeable battery 300 is in the fully charged state or not. For example, when the state information ("chargestatus (state)" in the example illustrated in FIG. 6) is in the fully charged state ("charge-stopped state" in the example illustrated in FIG. 6), the detection section 110 can detect that the charging section 310 is in the fully charged state.

The parameter "chargingdeviceindex" illustrated in FIG. 6 is information for identifying the rechargeable battery 300. That is to say, it is assumed that there are a plurality of the rechargeable batteries 300, and thus, in such a case, it is possible for the detection section 110 to identify a rechargeable battery 300 to be determined whether the battery is in a fully charged state or not by this information.

1.7 Service Provided from Execution Apparatus to Control Apparatus

FIG. 7 is a diagram illustrating an example of a service provided from the execution apparatus 200 according to the embodiment of the present disclosure to the control apparatus 100. A description will be given of the service provided from the execution apparatus 200 according to the embodiment of the present disclosure to the control apparatus 100 with reference to FIG. 7.

The task-information notification section 220 of the execution apparatus 200 provides, for example an SOAP action ("GetTaskList" in the example illustrated in FIG. 7) of UPnP to the control apparatus 100 so as to make it possible to notify a list of holdable tasks to the control apparatus 100. That is to say, the task-information acquisition section 130 of the control apparatus 100 calls the SOAP action ("GetTaskList" in the example illustrated in FIG. 7) of UPnP so as to make it possible to obtain a list of holdable tasks.

As illustrated in FIG. 7, a list of holdable tasks includes one or a plurality of pieces of information (task information) on holdable tasks. Each of the one or the plurality of pieces of task information includes at least information for identifying a holdable task (task-identification information), and may include a task name, an amount of electric power scheduled to be used by the task, execution start time, information indicating whether communication occur or not, etc. The execution control section 120 of the control apparatus 100 can identify a task to be executed from the task-identification information.

The task-information notification section 220 of the execution apparatus 200 provides, for example, a GENA event (protocol used for event notification) notifying update of a state variable ("TaskList state variable" in the example illustrated in FIG. 7) of UPnP to the control apparatus 100 so as to make it possible to notify a list of holdable tasks to the control apparatus 100 at the time when the list of holdable tasks is changed.

That is to say, the task-information notification section 220 may store the control apparatus 100 that has transmitted a GENA Subscribe message to the GENA Subscribe message to the service ("TaskHolder service" in the example illustrated in FIG. 7) of UPnP into the storage section 140, and when contents of the task list are changed, the task-information notification section 220 can notify the contents after the change to the control apparatus 100 by GENA Notify. However, the task list may be notified only to the control apparatus 100 stored in the storage section 140, or may be notified to all the apparatuses connected to the network 20 by broadcast.

Also, the task execution section 210 of the execution apparatus 200, for example, provides an SOAP action ("DoTask" in the example illustrated in FIG. 7) of UPnP to the control apparatus 100 so as to make it possible to execute a task identified by the task-identification information set as an argument at the time when the execution control section 120 calls this action.

The execution control section 120 of the control apparatus 100 can set the task-identification information obtained by the SOAP action ("GetTaskList" in the example illustrated in FIG. 7) of UPnP as the argument at the time of calling this action. If the task is not executed normally, the task execution section 210 of the execution apparatus 200 may return an error to the control apparatus 100.

1.8 Example of Screen Displayed by Execution Apparatus

Figure 8:
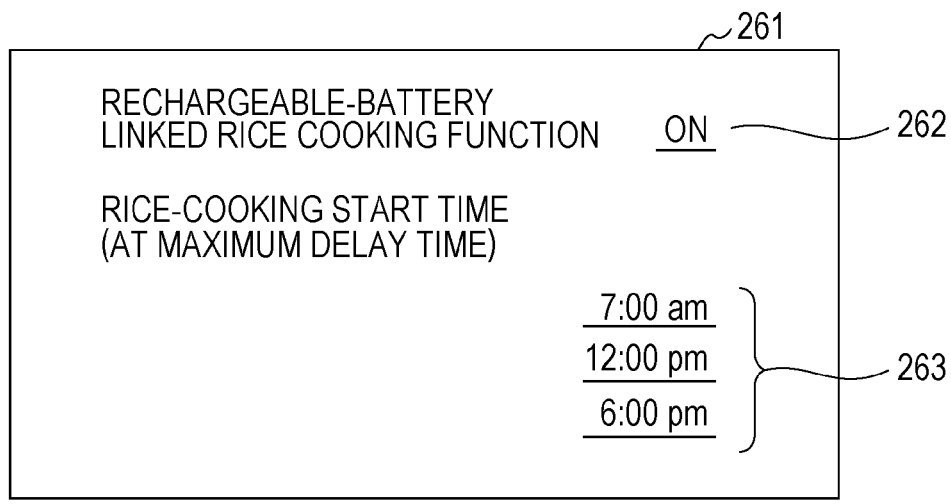
FIG. 8 is an example of a screen displayed by the execution apparatus according to an embodiment of the present disclosure.

FIG. 8 is an example of a screen displayed by the execution apparatus 200. A description will be given of an example of a screen displayed by the execution apparatus 200 according to the embodiment of the present disclosure with reference to FIG. 8.

The display section 260 of the execution apparatus 200 (for example, the rice cooker 200B) can display a screen 261 illustrated in FIG. 8 on the basis of information set by the control section 250, for example. The screen 261 includes a rechargeable-battery linked rice-cooking function field 262 which indicates whether to set a function of rice cooking "ON" or "OFF" in cooperation with the rechargeable battery 300, for example. For example, when the rechargeable battery linked rice-cooking function field 262 is "ON", the screen 261 includes a rice-cooking start time field 263 indicating rice-cooking start time at maximum delay time.

The user is allowed to input requested operation information to the input section 230. The control section 250 can switch information set in the rechargeable-battery linked rice-cooking function field 262 between "ON" and "OFF" on the basis of the operation information input by the user. Also, the control section 250 can set rice-cooking start time at maximum delay time in the rice-cooking start time field 263 on the basis of the operation information input by the user.

The control section 250 associates the set rice-cooking start time at maximum delay time with the holdable task information which is information for identifying a holdable task (the rice-cooking task in this example). The task information notification section 220 notifies the rice-cooking start time at maximum delay time and the holdable task information that are associated by the control section 250 to the control apparatus 100. The task-information acquisition section 130 of the control apparatus 100 stores the rice-cooking start time at maximum delay time and the holdable task information that are associated into the storage section 140.

When rice-cooking start time at maximum delay time is stored in the storage section 140 in association with holdable task information 141, and, if the detection section 110 detects that the rechargeable battery 300 is not in a fully charged state, it is possible for the execution control section 120 to restrict (or inhibit) giving an instruction to execute a holdable task (the rice-cooking task in this example) using electric power supplied from the rechargeable battery 300 to the execution apparatus 200 before the current time reaches the rice-cooking start time at maximum delay time.

Also, when the rice-cooking start time at maximum delay time is stored in the storage section 140 in association with the holdable task information 141, even if the detection section 110 detects that the rechargeable battery 300 is not in a fully charged state, the execution control section 120 can instruct the execution apparatus 200 to execute a holdable task (the rice-cooking task in this example) using electric power supplied from the rechargeable battery 300 at the time when the current time has reached the rice-cooking start time at maximum delay time. The rice-cooking start time at maximum delay time is an example of the execution start time.

That is to say, if execution start time is stored in the storage section 140 in association with holdable task information 141, the execution control section 120 can restrict (or inhibit) giving an instruction to the execution apparatus 200 to execute a holdable task using electric power supplied from the rechargeable battery 300 before the current time has reached the execution start time even if the detection section 110 detects that the rechargeable battery 300 is not in the fully charged state.

Also, if execution start time is stored in the storage section 140 in association with holdable task information 141, the execution control section 120 can instruct the execution apparatus 200 to execute a holdable task using electric power supplied from the rechargeable battery 300 at the time when the current time has reached the execution start time even if the detection section 110 detects that the rechargeable battery 300 is not in the fully charged state.

1.9 Another Example of Screen Displayed by Execution Apparatus

Figure 9:
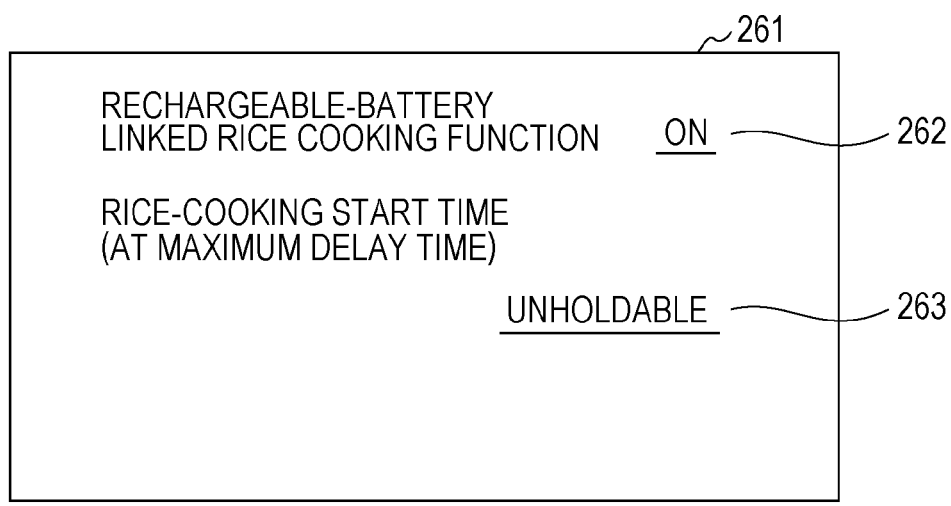
FIG. 9 is another example of a screen displayed by the execution apparatus according to an embodiment of the present disclosure.

FIG. 9 is another example of a screen displayed by the execution apparatus 200 according to the embodiment of the present disclosure. A description will be given of another example of a screen displayed by the execution apparatus 200 according to the embodiment of the present disclosure with reference to FIG. 9.

The display section 260 of the execution apparatus 200 (for example, the rice cooker 200B) can display, for example, a screen 261 illustrated in FIG. 9 on the basis of information set by the control section 250. The user is allowed to input requested operation information in the input section 230. The control section 250 can set unholdable information ("unholdable" in the example illustrated in FIG. 9), which is information for allowing the control apparatus 100 to handle a task identified by the holdable task information 141 (the rice-cooking task in this example) as an unholdable task, in the rice-cooking start time field 263 on the basis of the operation information input by the user.

The control section 250 associates unholdable information with holdable task information, which is information for identifying a holdable task (the rice-cooking task in this example). And the unholdable-information notification section 240 can notify the unholdable information and the holdable task information that are associated by the control section 250 to the control apparatus 100. If the holdable task information notified by the unholdable-information notification section 240 is associated with the unholdable information, the unholdable-information acquisition section 150 can change the task identified by the holdable task information obtained by the task-information acquisition section 130 to be handled as an unholdable task.

1.10 Relationship Between Task and Power Consumption

FIG. 10 is a diagram illustrating an example of a relationship between a task and power consumption. A description will be given of a method of determining execution order of a plurality of tasks on the basis of power consumption by the control apparatus 100 according to the embodiment of present disclosure with reference to FIG. 10.

As illustrated in FIG. 10, for example, in the case of the rice cooker 200B, it is customary that after rice cooking is complete, the rice cooker goes into a warming state, and thus power consumption becomes higher than that of before rice cooking. Also, for example, in the case of a washer and dryer 200A, it is customary that after washing is complete, the power is turned OFF, and thus power consumption becomes lower than that of before washing. In this manner, for a task whose standby power consumption (power consumption before execution and power consumption after execution) changes before and after execution, task scheduling may be carried out in consideration of standby power consumption.

That is to say, if there are a plurality of holdable tasks, it is possible for the execution control section 120 to determine execution order of the plurality of holdable tasks on the basis of each of power consumption before execution and power consumption after execution of the plurality of holdable tasks. It is possible for the execution control section 120 to instruct the execution apparatus 200 to execute a plurality of holdable tasks using electric power supplied from the rechargeable battery 300 in the determined execution order. Thereby, it is possible to reduce a total amount of power consumption used for executing a plurality of tasks.

More specifically, it is possible for the execution control section 120 to determine an execution order of a task whose power consumption before execution is higher than power consumption after execution (the washing task in the example illustrated in FIG. 10) to be higher than an execution order of a task whose power consumption after execution is higher than power consumption before execution (the rice-cooking task in the example illustrated in FIG. 10).

1.11 Relationship Between Communication Cost and Task Priority

FIG. 11 is a diagram illustrating an example of a relationship between a communication cost and a task priority. A description will be given of a method of determining priorities of a plurality of tasks on the basis of a communication cost by the control apparatus 100 according to the embodiment of the present disclosure with reference to FIG. 11.

When communication occurs in the course of executing a task, a communication cost thereof remains fixed regardless of passage of time in certain cases. However, in many cases, the communication cost normally varies with passage of time. Accordingly, the execution control section 120 can give higher priorities to tasks that do not accompany communication than tasks that accompany communication in a time period having a relatively high communication cost, and can instruct the execution apparatus 200 to execute a plurality of tasks.

On the other hand, in a time period having a relatively low communication cost, the execution control section 120 can give higher priorities to tasks that accompany communication than tasks that do not accompany communication, and can instruct the execution apparatus 200 to execute a plurality of tasks. Thereby, it is possible to reduce communication cost that is necessary for executing a plurality of tasks.

More specifically, as described with reference to FIG. 7, the task-information acquisition section 130 can obtain, for example, information on whether to generate communication or not as an example of information on a holdable task. The execution control section 120 can determine priorities of a plurality of tasks on the basis of information on whether to generate the communication or not.

1.12 Operation of Control Apparatus

Figure 12:
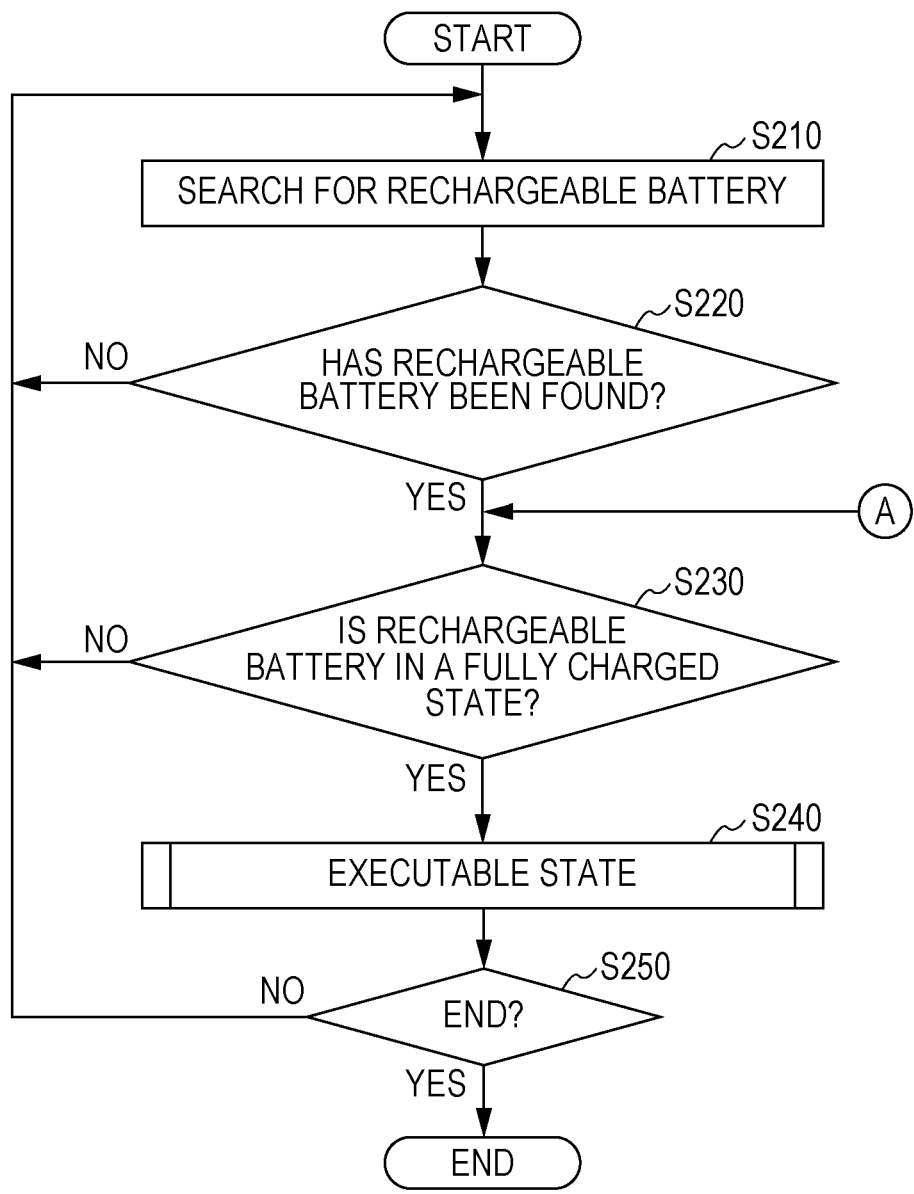
FIG. 12 is a flowchart illustrating operation of the control apparatus according to an embodiment of the present disclosure.

FIG. 12 is a flowchart illustrating operation of the control apparatus according to the embodiment of the present disclosure. A description will be given of the operation of the control apparatus according to the embodiment of the present disclosure with reference to FIG. 12.

The detection section 110 searches for a rechargeable battery 300 (step S210), and if a rechargeable battery 300 is not found ("No" in step S220), the processing returns to step S210. If a rechargeable battery 300 is found ("Yes" in step S220), the detection section 110 determines whether the found rechargeable battery 300 is in a fully charged state or not (step S230). If the detection section 110 determines that the found rechargeable battery 300 is not in a fully charged state ("No" in step S230), the processing returns to step S210.

If the detection section 110 determines that the found rechargeable battery 300 is in a fully charged state ("Yes" in step S230), the processing proceeds to an executable state (step S240), and when the executable state (step S240) terminates, the processing proceeds to step S250. A description will be given later of the executable state (step S240) with reference to FIG. 13.

The detection section 110 determines whether to terminate operation or not (step S250), and if determined to continue operation ("No" in step S250), the processing returns to step S210. Also, if determined that the task execution section 210 should terminate operation ("Yes" in step S250), the operation is terminated. It is possible for the user to input that the operation should be terminated, for example.

1.13 Operation in Executable State

Figure 13:
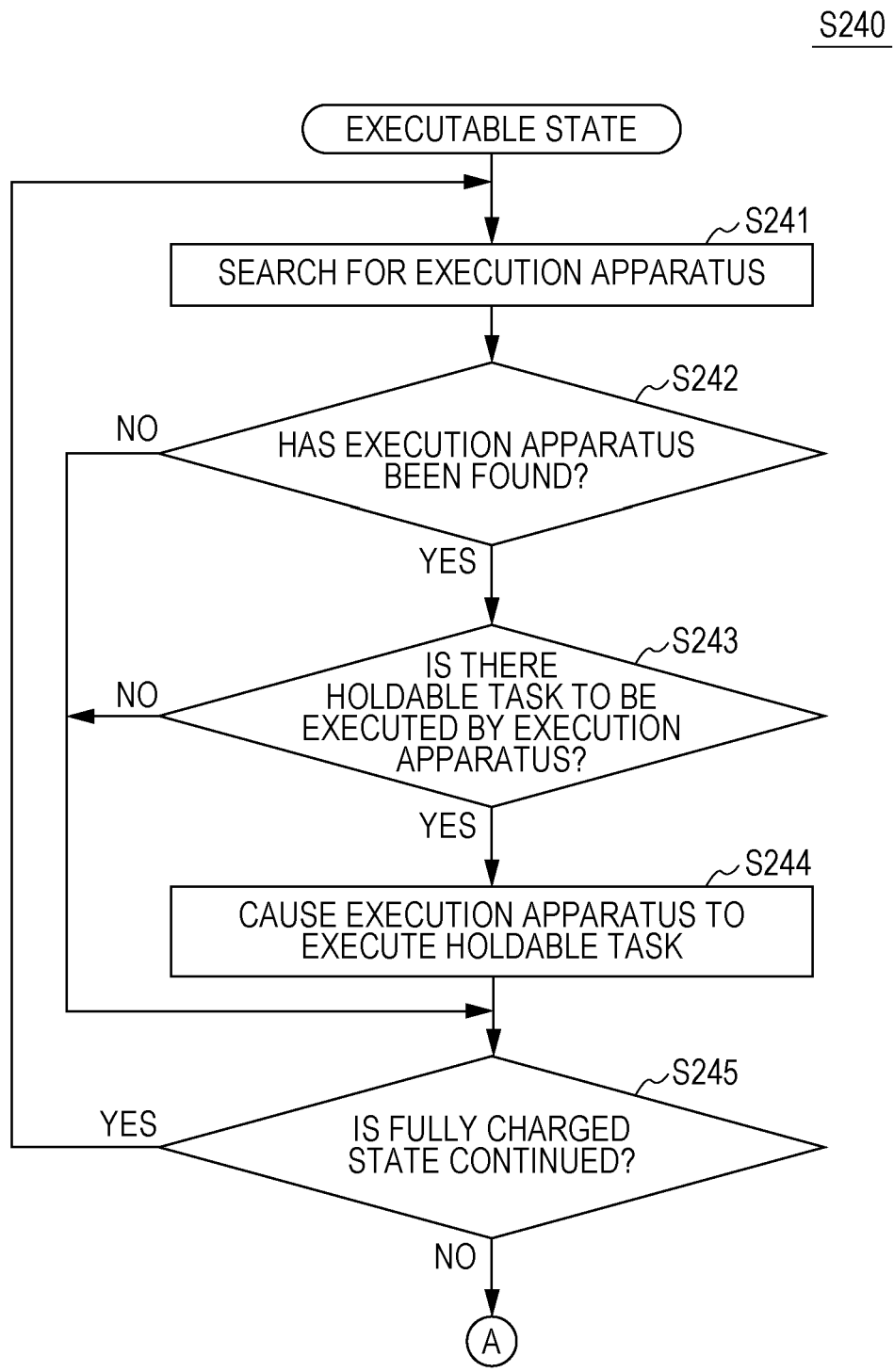
FIG. 13 is a flowchart illustrating operation in the executable state illustrated in FIG. 12.

FIG. 13 is a flowchart illustrating operation in the executable state (step S240) illustrated in FIG. 12. A description will be given of operation in the executable state (step S240) illustrated in FIG. 12 with reference to FIG. 13.

The execution control section 120 searches for an execution apparatus 200 (step S241), and if an execution apparatus 200 is not found ("No" in step S242), the processing proceeds to step S245. If an execution apparatus 200 is found, ("Yes" in step S242), the execution control section 120 determines whether there is a holdable task that executes the found execution apparatus 200 or not (step S243). If the execution control section 120 has determined that there is no holdable task that executes the found execution apparatus 200 ("No" in step S243), the processing proceeds to step S245.

If the execution control section 120 has determined that there is a holdable task that executes the found execution apparatus 200 ("Yes" in step S243), the execution control section 120 causes the execution apparatus 200 to execute the holdable task (step S244), and the processing proceeds to step S245. The holdable task is executed using electric power supplied from the rechargeable battery 300.

The detection section 110 determines whether a fully charged state of the rechargeable battery 300 continues (step S245), and if determined that the fully charged state of the rechargeable battery 300 does not continue ("No" in step S245), the processing proceeds to step S230 illustrated in FIG. 12. When the detection section 110 has determined that the fully charged state of the rechargeable battery 300 continues ("Yes" in step S245), the processing returns to step S241.

2. Variations

In the above, a detailed description has been given of preferred embodiments of the present disclosure with reference to the accompanying drawings. However, the present disclosure is not limited to such examples. It should be understood by those skilled in the art to which the present disclosure pertains that various changes and modifications may apparently occur within the spirit and the scope of the appended claims, and such changes and modifications may naturally fall within the spirit and the scope of the present disclosure.

For example, in the present embodiment, a description has been mainly given of an example in which the communication between the control apparatus 100 and the execution apparatus 200 is performed through the network 20. However, for example, the control apparatus 100 and the execution apparatus 200 may be integrated. Naturally, when the control apparatus 100 and the execution apparatus 200 are integrated, the communication through the network 20 becomes unnecessary between the control apparatus 100 and the execution apparatus 200. In this case, the control apparatus 100 may manage only tasks that are executed on the execution apparatus 200 that is integrated with the control apparatus 100, and it is not necessary to manage tasks that are executed on the other execution apparatuses 200 on the network 20.

Also, for example, in the present embodiment, a description has been mainly given of an example in which the communication between the rechargeable battery 300 and the control apparatus 100 is performed through the network 20. However, for example, the rechargeable battery 300 and the control apparatus 100 may be integrated. Naturally, when the rechargeable battery 300 and the control apparatus 100 are integrated, the communication through the network 20 becomes unnecessary between the rechargeable battery 300 and the control apparatus 100. In this case, the control apparatus 100 may manage only the states of the rechargeable batteries 300 that are integrated with the control apparatus 100, and it is not necessary to manage the states of the other rechargeable batteries 300 on the network 20.

3. Summary

By the present embodiment, it is possible to prevent electric power obtained by power generation from being wasted without being stored in the rechargeable battery 300 even in the case where the rechargeable battery 300 is in a fully charged state. For example, among the tasks that are executed by the execution apparatus 200 in homes, there have been tasks that are executed in a time period while electric power cost is high although the tasks have low urgency. Under these circumstances, there has been room for improvement in terms of a family budget, in terms of energy cost, and in terms of global environment. By the present embodiment, it is assumed that such circumstances can be substantially improved.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A control apparatus comprising:
a detection section configured to detect whether a rechargeable battery is in a fully charged state or not and a storage section configured to store holdable task information for identifying a holdable task,
wherein if the detection section detects that the rechargeable battery is in the fully charged state, an execution control section is configured to give an instruction to an execution apparatus to execute a holdable task using electric power supplied from the rechargeable battery;
wherein if the detection section detects that the rechargeable battery is in the fully charged state, the execution control section gives the instruction to the execution apparatus to execute a task identified by the holdable task information stored in the storage section using electric power supplied from the rechargeable battery; and
wherein when execution start time associated with the holdable task information is stored in the storage section, even if the detection section detects that the rechargeable battery is not in the fully charged state, the execution control section restricts giving the instruction to the execution apparatus to execute the holdable task using electric power supplied from the rechargeable battery before current time reaches the execution start time, and gives the instruction to the execution apparatus to execute the holdable task using electric power supplied from the rechargeable battery when the current time reaches the execution start time.

2. The control apparatus according to claim 1,
wherein if the detection section detects that the rechargeable battery is not in the fully charged state, the execution control section restricts giving an instruction to the execution apparatus to execute the holdable task using electric power supplied from the rechargeable battery.

3. The control apparatus according to claim 1, further comprising a task-information acquisition section configured to acquire holdable task information for identifying a holdable task from the execution apparatus,
wherein if the detection section detects that the rechargeable battery is in the fully charged state, the execution control section gives an instruction to the execution apparatus to execute a task identified by the holdable task information acquired by the task-information acquisition section using electric power supplied to the rechargeable battery.

4. The control apparatus according to claim 3,
wherein if the detection section detects that the rechargeable battery is not in the fully charged state, the execution control section causes the storage section to store the holdable task information acquired by the task-information acquisition section.

5. The control apparatus according to claim 1,
wherein the detection section detects again whether the rechargeable battery is in the fully charged state or not after the execution control section has executed a holdable task, and
if the detection section detects again that the rechargeable battery is in the fully charged state, the execution control section gives an instruction to the execution apparatus to execute another holdable task using electric power supplied from the rechargeable battery.

6. The control apparatus according to claim 1,
wherein if there are a plurality of the holdable tasks, the execution control section determines an execution sequence of the plurality of the holdable tasks on the basis of individual power consumption before execution and power consumption after execution of the plurality of the holdable tasks, and gives an instruction to the execution apparatus to execute the plurality of the holdable tasks using electric power supplied from the rechargeable battery in the execution sequence.

7. The control apparatus according to claim 1,
wherein the detection section obtains state information indicating whether the rechargeable battery is in the fully charged state or not from the rechargeable battery, and detects whether the rechargeable battery is in the fully charged state or not on the basis of the state information.

8. The control apparatus according to claim 1,
wherein the detection section obtains an amount of full charge of the rechargeable battery and a current amount of charge of the rechargeable battery, and detects whether the rechargeable battery is in the fully charged state or not on the basis of the amount of full charge and the current amount of charge.

9. The control apparatus according to claim 1,
wherein if there is an unholdable task, the execution control section gives an instruction to the execution apparatus to execute the unholdable task using electric power supplied from the rechargeable battery regardless of the case where the detection section detects that the rechargeable battery is in the fully charged state and the case where the detection section detects that the rechargeable battery is not in the fully charged state.

10. A method of controlling comprising:
detecting whether a rechargeable battery is in a fully charged state or not;
giving an instruction to an execution apparatus to execute a holdable task using electric power supplied from the rechargeable battery if detected that the rechargeable battery is in the fully charged state; and
giving the instruction to the execution apparatus to execute a task identified by the holdable task information stored in a storage section using electric power supplied from the rechargeable battery,
wherein when execution start time associated with the holdable task information is stored in the storage section, even if the detection section detects that the rechargeable battery is not in the fully charged state, the execution control section restricts giving the instruction to the execution apparatus to execute the holdable task using electric power supplied from the rechargeable battery before current time reaches the execution start time, and gives the instruction to the execution apparatus to execute the holdable task using electric power supplied from the rechargeable battery when the current time reaches the execution start time.

11. An execution apparatus comprising,
if a control apparatus detects that a rechargeable battery is in a fully charged state, a task execution section is configured to execute a holdable task using electric power supplied from the rechargeable battery on the basis of an instruction given from the control apparatus,
wherein the task execution section is configured to execute a task identified by the holdable task information stored in a storage section using electric power supplied from the rechargeable battery on the basis of the instruction given from the control apparatus, and
wherein when execution start time associated with the holdable task information is stored in the storage section, even if the detection section detects that the rechargeable battery is not in the fully charged state, the control apparatus restricts giving the instruction to the execution section to execute the holdable task using electric power supplied from the rechargeable battery before current time reaches the execution start time, and gives the instruction to the execution section to execute the holdable task using electric power supplied from the rechargeable battery when the current time reaches the execution start time.

12. The execution apparatus according to claim 11, further comprising
a task-information notification section configured to notify holdable task information for identifying the holdable task to the control apparatus,
wherein if instructed from the control apparatus to execute the holdable task identified by the holdable task information notified by the task-information notification section to the control apparatus, the task execution section executes the holdable task.

13. The execution apparatus according to claim 12, further comprising:
an input section configured to receive input of operation information from a user; and
on the basis of the operation information received by the input section, a unholdable task-information notification section configured to notify unholdable task-information being information for causing the control apparatus to handle a task identified by the holdable task information as an unholdable task.

14. The control apparatus according to claim 1, wherein the holdable task is at least corresponding to a task that is not necessary to be executed immediately.

15. The method of controlling according to claim 10, wherein the holdable task is at least corresponding to a task that is not necessary to be executed immediately.

16. The execution apparatus according to claim 11, wherein the holdable task is at least corresponding to a task that is not necessary to be executed immediately.

* * * * *